United States Patent [19]

Berecz

[11] Patent Number: 4,718,801
[45] Date of Patent: Jan. 12, 1988

[54] COMPOSITE CORE FASTENER

[75] Inventor: Imre Berecz, Laguna Beach, Calif.

[73] Assignee: Microdot Inc., Darien, Conn.

[21] Appl. No.: 888,700

[22] Filed: Jul. 24, 1986

[51] Int. Cl.⁴ .............................................. F16B 35/00
[52] U.S. Cl. .................... 411/378; 411/900; 411/901; 411/904; 411/908
[58] Field of Search ............... 411/378, 900, 901, 904, 411/908, 383, 385, 914

[56] References Cited

U.S. PATENT DOCUMENTS

| 255,043 | 3/1882 | Smith | 411/914 X |
| 2,432,986 | 12/1947 | Forman | 411/914 X |
| 4,478,544 | 10/1984 | Strand | 411/901 X |
| 4,687,395 | 8/1987 | Berecz et al. | 411/361 |

FOREIGN PATENT DOCUMENTS

| 1084088 | 6/1960 | Fed. Rep. of Germany | 411/901 |
| 487251 | 1/1976 | U.S.S.R. | 411/900 |
| 504860 | 4/1976 | U.S.S.R. | 411/900 |
| 545785 | 3/1977 | U.S.S.R. | 411/424 |

Primary Examiner—Gary L. Smith
Assistant Examiner—Rodney M. Lindsey
Attorney, Agent, or Firm—Lyman R. Lyon

[57] ABSTRACT

A fastener comprises composite head and shank portions having an encapsulating metal sheath thereon that is electrically isolated from conductive fibers in the head and shank portions and from an exposed surface of the head portion.

3 Claims, 4 Drawing Figures

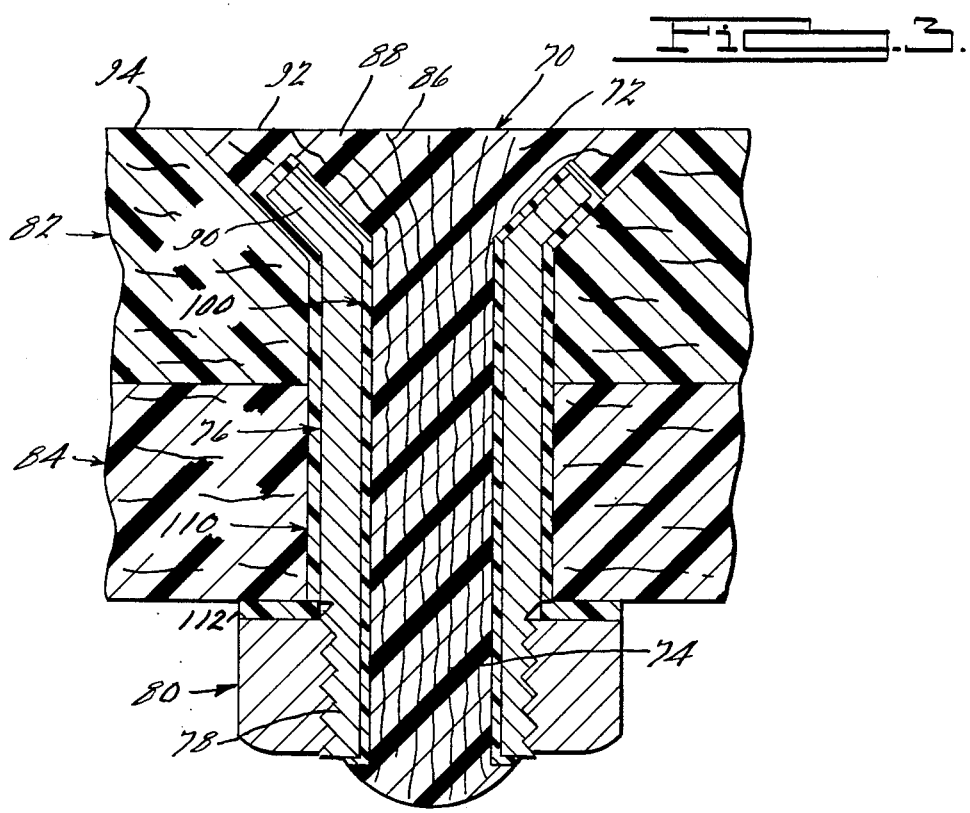
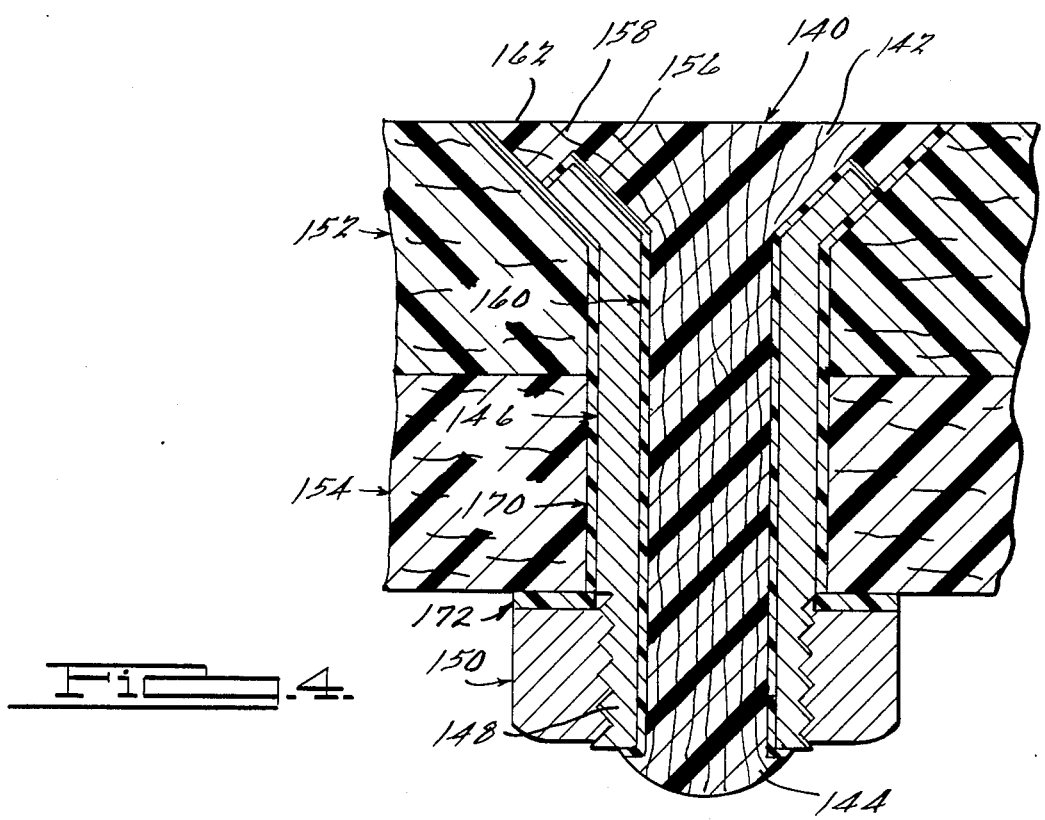

COMPOSITE CORE FASTENER

BACKGROUND OF THE INVENTION

Combination metal and composite fasteners exhibit a relatively high strength-to-weight ratio that renders them usable for aircraft application, particularly fastening of skin panels. However, since an aircraft is exposed to lightening strikes in flight, precaution must be taken to dissipate the electrical energy of the lightening strike without compromising the structural integrity of the airframe. This has heretofore presented a problem since composite materials are generally less conductive than the metallic components of the fasterner. When electrical continuity across the exterior surface of a composite airfoil is disrupted, an electrical potential tends to build up, often resulting in an arc which, in some cases, can destroy the fastener.

A specific problem that is addressed by the instant invention is the problem experienced when an unshielded electrically conductive bolt, rivet, or the like, is seated in an aperture in a composite structure. When lightening strikes the surface of the composite structure, the electrical energy is conducted by the carbon filaments thereof until the metallic portion of the bolt or fastener is reached. Because the bolt presents less electrical resistance than the carbon fibers of the composite skin, the electrical energy tends to follow the bolt. However, because the conductive path offered by the bolt is discontinuous, the structural integrity thereof is often compromised due to subsequent capacitive discharge of the electrical energy.

SUMMARY OF THE INVENTION

The fastener of the instant invention addresses the problem of lightening strike by insulating the metallic portion thereof from the surface of a composite structure. This is accomplished by terminating the metallic portion of the fastener short of the outer surface of a composite head portion thereof. Electrical energy conducted by the carbon fibers of the composite structure thus have a path across the composite head of the bolt to the fibers on the far side of the aperture containing the bolt thus allowing energy to dissipate across the entire skin of the aircraft as opposed to being directed laterally into the highly conductive metallic portion of the bolt.

BRIEF DESCRIPTION OF THE DRAWINGS

FIG. 3 is a view similar to FIG. 1 of another embodiment of the instant invention; and FIG. 4 is a view similar to FIG. 1 of yet another embodiment of the instant invention.

DETAILED DESCRIPTION OF THE PREFERRED EMBODIMENT OF THE INVENTION

Figure 1:
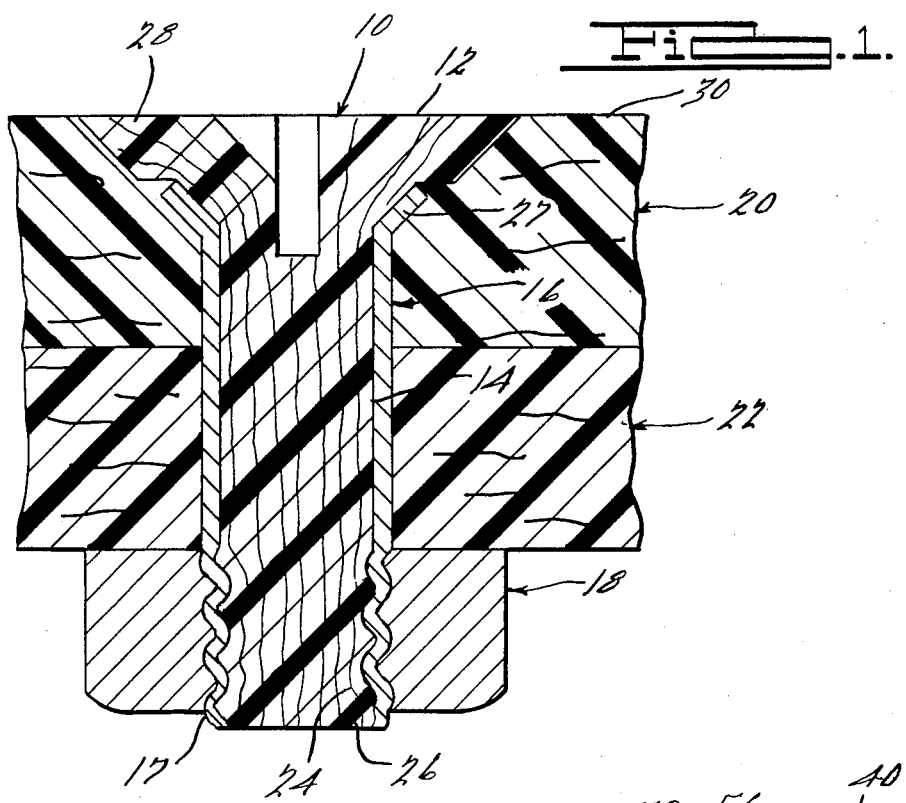
FIG. 1 is a cross-sectional view of an encapsulated bolt in accordance with one embodiment of the instant invention.

As seen in FIG. 1 of the drawing, a fastener 10, in accordance with a constructed embodiment of the present invention, comprises a composite head portion 12, a composite shank portion 14 and a metal sheath 16. A lower end 17 of the shank portion 14 and sheath 16 is threaded for the acceptance of a conventional nut 18.

The fastener 10 is utilized to fasten two sheets of composite material 20 and 22 to one another.

The composite head portion 12 and shank portion 14 of the fastener 10 comprise conductive carbon fibers 24, embedded in a non-conductive resin matrix 26. It has been found that density of the carbon fibers 24 to the resin 26 of 70% by weight results in optimum physical characteristics. Because each of the carbon fibers 24 is surrounded by resin 26, insulation is provided between adjacent fibers 24 and between the fibers 24 and the metal sheath 16 of the fastener 10.

It is to be noted that an upper end portion 27 of the metal sheath 16 terminates well below an upper surface 28 on the composite head portion 12 of the fastener 10 whereby the sheath 16 is insulated from electrical discharges, for example, a lightening strike, traveling across an upper surface 30 of the workpiece 20.

Figure 2:
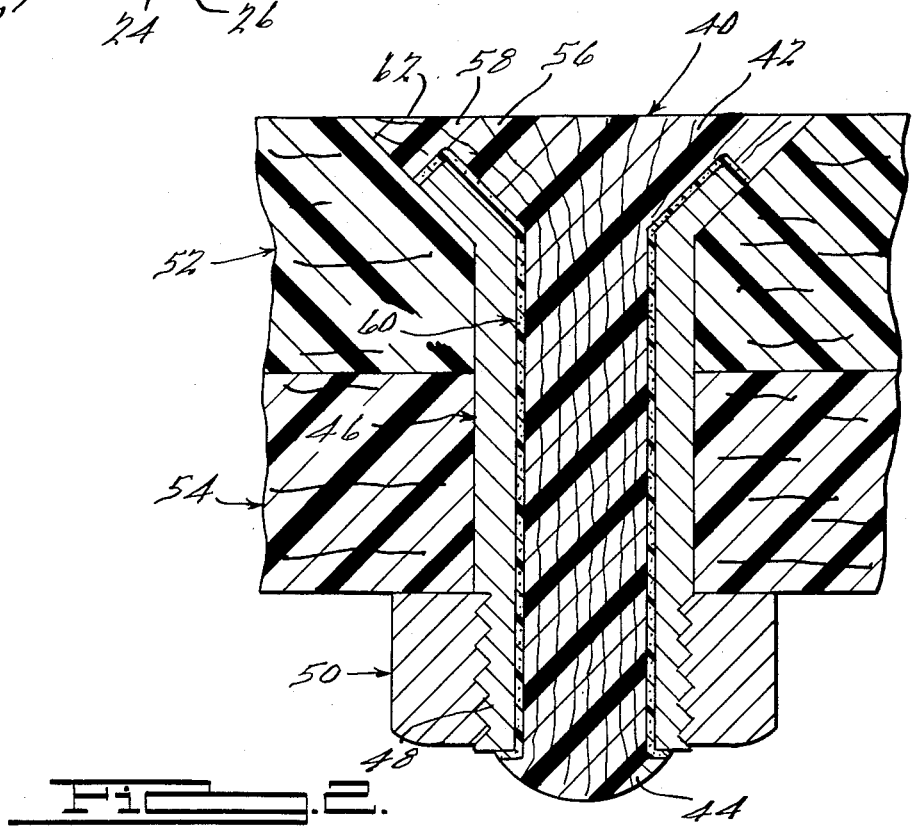
FIG. 2 is a view similar to FIG. 1 of a second embodiment of the instant invention.

As seen in FIG. 2 of the drawings, an encapsulated fastener 40, in accordance with another embodiment of the present invention, comprises a composite, truncated conical head portion 42, and a cylindrical shank portion 44. The shank portion 44 is encased in a metal sleeve 46 having a threaded end portion 48 for the acceptance of a conventional nut 50. The fastener 40 is utilized to fasten two sheets of composite material 52 and 54 to one another. The head and shank portion 42 and 44 comprise carbon fibers 56 embedded in an insulating resin matrix 58.

Insulation is provided between the shank 44 and metal sleeve 46 by a nonconductive composite sheath 60 made from, for example, Kevlar fibers, in a resin matrix. The sheath 60 provides electrical insulation between an upper surface 62 on the head portion 42 of the fastener 40 and the metal sleeve 46.

As seen in FIG. 3 of the drawing, a fastener 70, in accordance with another embodiment of the present invention, comprises a composite head portion 72, a composite shank portion 74 and a metal sheath 76. A lower end 78 of the sheath 76 is threaded for the acceptance of a conventional nut 80. The fastener 70 is utilized to fasten two sheets of composite material 82 and 84 to one another.

The composite head portion 72 and shank portion 74 of the fastener 70 contain conductive carbon fibers 86, embedded in a nonconductive resin matrix 88. It has been found that density of the carbon fibers 86 to the resin 88 of 70% by weight results in optimum physical characteristics. Because each of the carbon fibers 86 is surrounded by resin 88, insulation is provided between adjacent fibers 86 and between the fibers 86 and the metal sheath 76 of the fastener 70.

An upper end portion 90 of the metal sheath 76 terminates well below an upper surface 92 on the head portion 72 of the fastener 70 whereby the metal sheath 76 is insulated from electrical discharges, for example, a lightening strike, traveling across an upper surface 94 of the workpiece 82.

To provide further insulation, an insulating sleeve 100 is provided between the composite shank 74 and metal sleeve 76 made from, for example, Kevlar.

In accordance with this embodiment of the invention, another nonconductive sheath 110 of, for example, Kevlar composite, extends exteriorly of the metal sleeve 76 from a point on the head 72 of the fastener 70 adjacent the upper end of the sleeve 100 to the lower surface of the workpiece 84. An insulating washer 112 completes electrical isolation of the metal sheath from the workpieces 82 and 84.

As seen in FIG. 4 of the drawings, an encapsulated fastener 140, in accordance with another embodiment of the present invention, comprises a composite, truncated conical head portion 142, and a cylindrical shank portion 144. The shank portion 144 is encased in a metal sleeve 146 having a threaded end portion 148 for the acceptance of a conventional nut 150. The fastener 140 is utilized to fasten two sheets of composite material 152 and 154 to one another. The head and shank portion 142 and 144 may comprise conductive carbon fibers 156 embedded in an insulating resin matrix 158.

Insulation is provided between the shank 144 and metal sleeve 146 by a nonconductive composite sheath 160 made from, for example, Kevlar. In this embodiment, an external nonconductive sheath 170 is provided for the entire metal sheath 146 and head portion 142 of the fastener 140 to provide an extra measure of electrical insulation to the metal element 146. A washer 172 electrically isolates the metal sheath 146 and nut 150 from the workpieces 152 and 154.

While the preferred embodiment of the invention has been disclosed, it should be appreciated that the invention is susceptible of modification without departing from the scope of the following claims.

I claim:

1. A fastener comprising a composite core having an enlarged head portion at one end and a shank portion at the other end said head portion being of a diameter greater than that of said shank portion, and a metal sleeve encapsulating the shank portion of said core and a portion of the head portion and an outer surface of said sleeve being threaded for the acceptance of a nut, said metal sleeve being spaced axially from an axial end face of the head portion whereby said metal sleeve is electrically isolated from the end surface on the head portion of said fastener.

2. A composite core fastener in accordance with claim 1 wherein said core comprises a plurality of electrically conductive fibers electrically isolated from one another and from said metal sleeve by a nonconductive resin matrix.

3. A composite core fastener comprising an inner composite core having an enlarged head portion at one end and a shank portion at the other end said head portion being of a diameter greater than that of said shank portion, a metal sleeve encapsulating the shank portion of said fastener and a portion of the head portion thereof, said metal sleeve terminating below an upper end surface of the head portion of said fastener, and a nonconductive sheath interposed between the composite shank portion and metal sleeve of said fastener to further electrically isolate said metal sleeve from the upper end surface of the head portion of said fastener and an outer surface of said sleeve being threaded for the acceptance of a nut.

* * * * *